United States Patent
Fink et al.

(10) Patent No.: US 7,524,382 B2
(45) Date of Patent: Apr. 28, 2009

(54) METHOD FOR SUBSTRATE STABILIZATION OF DIFFUSION ALUMINIDE COATED NICKEL-BASED SUPERALLOYS

(75) Inventors: Paul J. Fink, Maineville, OH (US);
Brian T. Hazel, West Chester, OH (US);
Christine Govern, Cincinnati, OH (US);
Joseph M. Greene, Indianapolis, IN (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 11/359,788

(22) Filed: Feb. 22, 2006

(65) Prior Publication Data
US 2009/0074972 A1     Mar. 19, 2009

Related U.S. Application Data

(60) Provisional application No. 60/656,691, filed on Feb. 26, 2005.

(51) Int. Cl.
*C23C 8/20* (2006.01)

(52) U.S. Cl. ............... 148/206; 148/213; 148/316

(58) Field of Classification Search ............... 148/206, 148/210, 213, 214, 217, 220, 237; 427/249.1, 427/383.1, 383.3, 404, 405
See application file for complete search history.

(56) References Cited

U.S. PATENT DOCUMENTS

| | | | |
|---|---|---|---|
| 4,208,453 A | 6/1980 | Baldi | |
| 4,836,864 A | 6/1989 | Murakami et al. | |
| 5,205,873 A | 4/1993 | Faure et al. | |
| 5,330,813 A | 7/1994 | Hirooka et al. | |
| 5,598,968 A | 2/1997 | Schaeffer et al. | |
| 5,702,540 A | 12/1997 | Kubota | |
| 5,891,267 A * | 4/1999 | Schaeffer et al. | 148/206 |
| 6,187,111 B1 | 2/2001 | Waka et al. | |
| 6,447,932 B1 * | 9/2002 | O'Hara et al. | 428/627 |
| 2003/0020214 A1 | 1/2003 | Poor et al. | |

FOREIGN PATENT DOCUMENTS

| | | |
|---|---|---|
| EP | 545661 A2 | 11/1992 |
| EP | 1522607 A1 | 6/2004 |

* cited by examiner

*Primary Examiner*—John J Zimmerman
(74) *Attorney, Agent, or Firm*—McNees Wallace & Nurick LLC

(57) ABSTRACT

An article and method for stabilization of a nickel-based superalloy coated with a diffusion aluminide coating. The region below the aluminide coating is first carburized to form refractory carbides. The article is cleaned and masked as required so that regions that will not have an aluminide coating are not carburized. After placing the article into a furnace and heating in a non-oxidizing atmosphere to a carburizing temperature, a carburizing gas is introduced, and the near surface region is carburized to a depth of about 100 microns. Refractory carbides are formed in this region. When a diffusion aluminide coating is formed on the article, the refractory elements, being present as refractory carbides, are not available to form detrimental TCP phases.

15 Claims, 3 Drawing Sheets

A   Flow diagram of carburization process

B   Flow diagram description of what happens during carburization

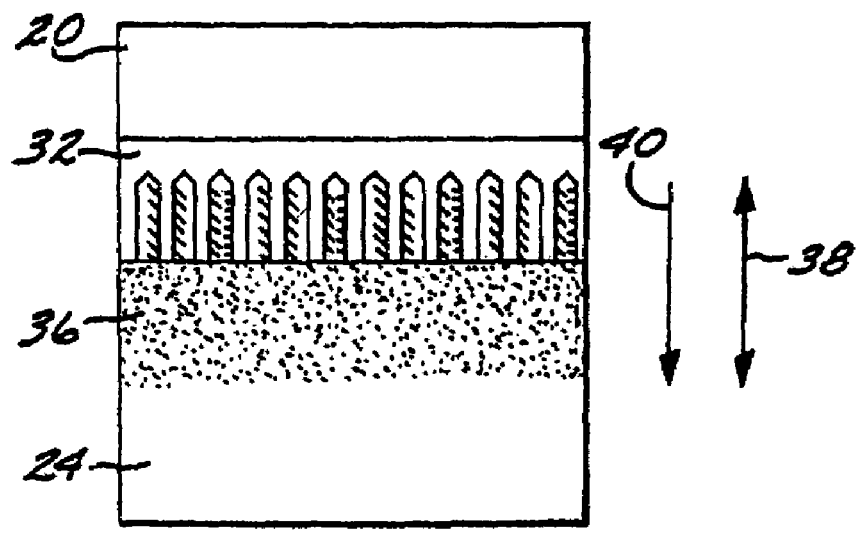

METHOD FOR SUBSTRATE STABILIZATION OF DIFFUSION ALUMINIDE COATED NICKEL-BASED SUPERALLOYS

This application claims the benefit of U.S. Provisional Patent Application No. 60/656,691, filed Feb. 26, 2005, the contents of which Application are expressly incorporated herein by reference.

FIELD OF THE INVENTION

The present invention relates to the carburization of nickel-based superalloys, and more particularly, to methods for carburizing nickel-based superalloys that include refractory elements for preventing the formation of secondary reaction zones.

BACKGROUND OF THE INVENTION

In a gas turbine engine such as used for aircraft applications, air is drawn into the front of the engine, compressed by a compressor, and mixed with fuel. The compressed mixture is burned in a combustor, and the hot combustion gases flow through a turbine that turns the compressor. The hot gases then flow from the rear of the engine.

The turbine includes stationary turbine vanes that deflect the hot gas flow sideways, and turbine blades mounted on a turbine wheel that turns as a result of the impingement of the hot gas stream. The turbine vanes and blades experience extreme conditions of high temperature, thermal cycling when the engine is turned on and off, oxidation, corrosion, and, in the case of the turbine blades, high stress and fatigue loadings. The higher the temperature of the hot combustion gas, the greater the efficiency of the engine. There is therefore an incentive to push the materials of the engine to ever-higher temperatures and loadings.

Nickel-based superalloys are widely used as the materials of construction of gas turbine blades and vanes. These superalloys contain primarily nickel, and a variety of alloying elements such as cobalt and aluminum, as well as refractory elements such as tantalum, tungsten, chromium, rhenium, hafnium, and others in varying amounts carefully selected to provide good mechanical properties and physical characteristics over the extremes of operating conditions experienced by the engine. However, these refractory elements, which provide the nickel-based superalloys with superior mechanical properties, also make superalloy articles susceptible to the formation of a secondary reaction zone ("SRZ") in certain circumstances. In particular, gas turbine alloy airfoils, such as the turbine blade and vanes discussed above, typically require an aluminide coating treatment as part of a thermal barrier coating system and/or to provide environmental protection. Nickel-based superalloy articles that include refractory elements and which undergo aluminiding treatments are particularly susceptible to formation of an SRZ, wherein an acicular topologically close-packed (TCP) phase forms, such as disclosed in "A New Type of Microstructural Instability in Superalloys—SRZ," *Superalloys,* 1996 by W. S. Walston, J. C. Schaeffer and W. H. Murphy, ed. R. D. Kissinger, et al. TMS pp. 9-18. Within the SRZ, the TCP phases are brittle and contain a high percentage of refractory elements. In particular, the presence of the brittle phases, the formation of high angle grain boundaries between the SRZ and the alloy, and to a lesser extent, the depletion of the refractory elements weaken the SRZ, making the SRZ essentially non-load-bearing. Because this portion of the article is unable to sustain its share of the load, the applied load is shifted to the remainder of the article, increasing the stress in this portion of the article and shortening its service life.

The problem with refractory elements in nickel-based superalloy articles forming SRZ is known, having been identified in U.S. Pat. No. 5,334,262, entitled SUBSTRATE STABILIZATION OF DIFFUSION ALUMINIDE COATED NICKEL-BASE SUPERALLOYS issued Aug. 2, 1994 to Schaeffer and assigned to the assignee of the present invention. This patent also identifies forming carbide precipitates which reduce the driving force for the formation of TCP phases within the substrate, a method for avoiding the formation of SRZ, by depositing a layer of carbon on the surface of the substrate by chemical vapor deposition and diffusing the carbon onto the surface. The presence of the carbon allows for the combination of carbon with the refractory elements to form stable carbides, substantially reducing the refractory elements unavailable for the formation of TCP phases. This patent, U.S. Pat. No. 5,334,262 is incorporated in its entirety herein by reference, forming a part of this specification.

Carbon can be introduced into the nickel-based superalloy article by carburizing techniques, such as vacuum carburizing. Vacuum carburizing of steel is a well-known technique. U.S. Pat. No. 4,836,864 issued Jun. 6, 1989, entitled "Method of Gas Carburizing and Hardening" discloses gas carburizing and hardening a steel article in a carburizing atmosphere at atmospheric pressure, heating the article in a vacuum for a predetermined period of time and hardening the article. U.S. Pat. No. 5,702,540 issued Dec. 30, 1997 entitled "Vacuum Carburizing Method and Device, and Carburized Products" teaches vacuum carburizing steel workpieces in a vacuum furnace by introducing acetylene gas into the chamber at a vacuum of 1 kPa or less to produce a hardened and uniform case depth in the steel article. U.S. patent No. Feb. 13, 2001 entitled "Vacuum Carburizing Method" divulges an improved vacuum carburizing method for steel by heating the steel material to about 900-1100° C. and then introducing ethylene gas while maintaining a vacuum of 1-10 kPa, thereby eliminating the potentially explosive acetylene and replacing the expensing vacuum pumps or mechanical booster pumps required to maintain vacuums at or below 1 kPa.

Of course, it may also be desirable to prevent selected portions of the article from being carburized by preventing contact of the surface with carbon. It is known to mask all or a selected portion of an article surface with a cover or coating to prevent it from being carburized. These coatings or covers, also referred to as a maskant, typically are platings and are usually very effective. These coatings, however, must be easy to remove or must be incorporated into the article. Typical maskants include nickel plating and copper plating. However, such plating may be unsuitable for articles that have precise shapes or include intricate details, since removing such plating after carburization can be difficult or impossible without damaging the article. However, a boron glass coating used as a maskant containing magnesium silicon compounds may be acceptable for use on intricate articles such as turbine blades, as this material can provide protection from carburization to selected, intricate areas of an airfoil, yet can be removed without damaging the airfoil. This maskant system is described in U.S. Patent Application No. 20020020471, published Feb. 21, 2002, and also is incorporated herein by reference.

Coatings typically are formed on the surfaces of the superalloy articles to protect the article from degradation in harsh, high temperature environments. One type of coating is an aluminide coating. Aluminum is diffused into the surface of the nickel-based superalloy article to form a nickel-aluminide layer, which then oxidizes to form an aluminum oxide surface coating during treatment or in service. (Optionally, noble metals such as platinum may also be diffused into the surface). The aluminum oxide surface coating renders the coated article more resistant to oxidation and corrosion, desirably without impairing its mechanical properties. Aluminide coating of turbine blades and vanes is well known and widely practiced in the industry, and is described, for example, in U.S. Pat. Nos. 3,415,672 and 3,540,878.

Recently it has been observed that, when some advanced nickel-based superalloys are coated with an aluminide coating and then exposed to service or simulated-service conditions, a secondary reaction zone (SRZ) forms in the underlying superalloy. This SRZ region is observed at a depth of from about 50 to about 250 micrometers (about 0.002-0.010 inches) below the original superalloy surface that has received the aluminide coating. The presence of the SRZ reduces the mechanical properties in the affected region, because the material in the SRZ appears to be brittle and weak, and forms a high angle grain boundary between SRZ and the alloy.

The formation of the SRZ is a major problem in some types of turbine components, because there are cooling channels located about 750 micrometers (about 0.030 inches) below the surface of the article. Cooling air is forced through the channels during operation of the engine, to cool the structure. If the SRZ forms in the region between the surface and the cooling channel, it significantly weakens that region and can lead to reduced strength and fatigue resistance of the article.

While the prior art prevents the formation of the TCP phases that weaken the SRZ, the prior art relies solely on a diffusion mechanism to diffuse inward the carbon deposited on the surface of the superalloy substrate. While acceptable results can thus be obtained, it is desirable to improve the methods of deposition to control the depth of carburization while allowing the absorption of carbon into the surface quickly.

SUMMARY OF THE INVENTION

The present invention provides methods for carburizing a nickel-based superalloy that includes refractory elements using alkynes or ethylene ($C_2H_4$) as the carburizing agent. In accordance with the present invention, a nickel-based superalloy that includes refractory elements is carburized, under controlled conditions, using alkyne gases, propane or ethylene gas ($C_2H_4$) or combinations thereof as the carburizing agent in order to form stable refractory carbides at a controlled, preselected distance below the surface. These stable refractory carbides reduce the driving force for the formation of TCP phases that would otherwise produce a weak SRZ in the controlled, preselected distance at and below the substrate surface.

The present invention contemplates cleaning the article surface. Cleaning the article surface entails removing all oxides from the surface of the substrate and preventing the reformation of oxides from the surface that is to be carburized. It is imperative that the surface that is to be carburized is free of oxides. Removing oxides can be accomplished by mechanical or chemical methods which do not damage or otherwise adversely affect the substrate surface. After such cleaning, the surfaces may be cleaned with a suitable solvent, while avoiding the formation of new oxides. While oxides are to be avoided, it may be desirable to mask portions of the surface in order to prevent these portions from being carburized. This may be desirable for any one of a number of reasons, such as portions of the surface may not be exposed to an aluminizing treatment or the stresses in the portion of the surface are not determinative of part life in that portion of the article. In this event, the portion which should not be carburized is masked. The masking should prevent carburizing of the area masked, should be stable at the elevated temperatures of operation, and should be easy to remove after carburizing, or otherwise be capable of being incorporated into the article.

The cleaned article is then loaded into a furnace suitable for performing the carburization process while also preventing the formation of oxides. Suitable furnaces include vacuum furnaces or furnaces that can maintain a controlled atmosphere. When maintaining a controlled atmosphere, the atmosphere must be non-oxidizing, as oxidation of the article surface must be prevented during heat-up to the carburizing temperature and during carburizing. Once the carburizing temperature is approached, the carburizing gas, alkyne. propane or ethylene, is introduced into the furnace. These carburizing gases may be introduced below the carburizing temperature with hydrogen or to gradually replace hydrogen, but should not be added at a temperature or in a volume that will result in excessive soot formation. The carburizing gas is provided either on a continuous basis or by a pulse method. Regardless of the method, the carburizing gas is provided to ensure sufficient carbon is present at the surface for desired carburization so that carbides are formed in a layer of sufficient thickness, so that the layer will not form TCP phases after subsequent exposure to aluminum as a result of aluminizing. The article will thus be free of the SRZ. The duration of the carburization process itself is controlled to limit the depth of carbide layer formation, since carbide layers that are too thick also can adversely affect the mechanical properties of the article. Clearly, over-carburization that produces a layer that is too thick results in a substrate that is devoid of the beneficial effects of the refractory elements, as the refractory elements are tied up in the stable carbides.

The carburization process is completed by purging the chamber of the carburizing gas. This can be accomplished by stopping the flow of the carburizing gas and introducing an inert gas, nitrogen or hydrogen into the chamber. This also serves to quickly cool the article. Any masking that has been applied may now be removed. The article can now be heat treated to in any way, such as by aging, to cause the precipitation of desirable strengthening phases such as gamma prime and/or gamma double prime, if these phases have not previously been formed. The article can now also be aluminided. The aluminiding treatment can be accomplished by the addition of an additive aluminide layer. Alternatively, the aluminide may be by a thermally grown aluminide method, in which the aluminide layer is grown into the top surface. While the method of aluminiding does not matter, it is important that the aluminum from the aluminide process does not penetrate significantly (a few microns) below the layer of carbides.

An advantage of the present invention is that the process can be carried out quickly and the carburization depth, the depth of formation of the refractory carbides, can be closely controlled, because the use of controlled flow of the reactive alkyne gases or ethylene provides the necessary supply of carbon at the surface of the article, increasing the chemical activity of carbon at the surface as compared to prior art methods of introducing carbon to the surface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 is an enlarged, diagrammatic sectional view of the microstructure near the surface of an article like that depicted in FIGS. 1-3, except that the process treatment of FIG. 4 has been utilized.

DETAILED DESCRIPTION OF THE INVENTION

Figure 1:
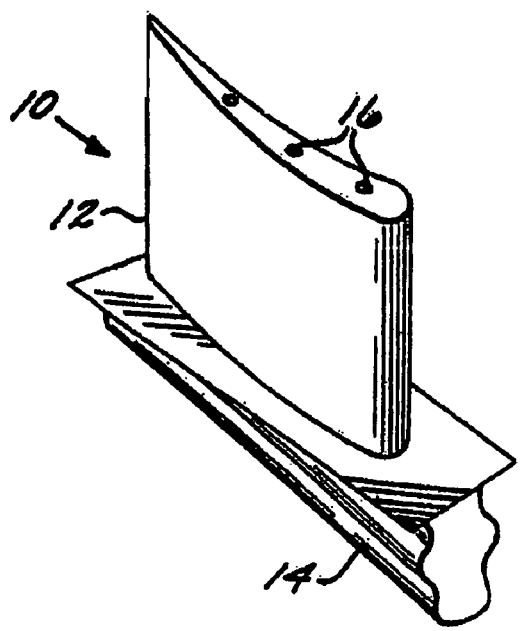
FIG. 1 is a perspective view of a superalloy article.

The stabilization approach of the invention is used with nickel-based superalloys, in applications such as a jet engine airfoils including turbine vanes and the illustrated gas turbine blade 10 of FIG. 1. The blade may be formed of any nickel-based superalloy that has a tendency to form a sub-surface secondary reaction zone during and after an aluminide treatment. These superalloys typically include reactive elements such as tantalum, tungsten, molybdenum, chromium, rhenium, hafnium, ruthenium, iridium, osmium, and in certain alloys, platinum, palladium and rhodium, and others which are added to provide enhanced mechanical properties such as strength. Examples of such nickel-based superalloys include Rene 162. and patented alloy known as 4EPM102C whose composition is disclosed in U.S. Pat. No. 5,151,249, incorporated herein by reference. Rene 162, for example, has a composition in weight percent of about 12.5 percent cobalt, 4.5 percent chromium, 6.25 percent rhenium, 7 percent tantalum, 5.74 percent tungsten, 6.25 percent aluminum, 0.15 percent hafnium, 0.5 percent yttrium, minor amounts of other elements, and balance nickel.

The blade 10 includes an airfoil section 12 against which hot combustion gases are directed when the engine operates, and whose surface is subjected to severe oxidation and corrosion attack during service. The airfoil section 12 is anchored to a turbine disk (not shown) through a dovetail or root section 14. In some cases, cooling passages 16 are present in the airfoil section 12, through which cool bleed air is forced to remove heat from the blade 10. The blade is normally prepared by a casting and solidification procedure well known to those skilled in the art, such as investment casting, directional solidification, or single crystal growth.

Figure 2:
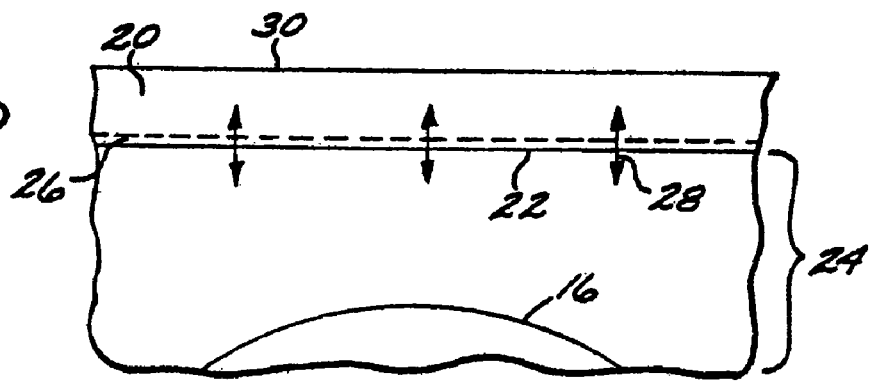
FIG. 2 is a schematic sectional view of the article of FIG. 1 taken generally along line 2-2, illustrating the near-surface region during a diffusional platinum-aluminiding treatment when the treatment of the present invention is not used.
Figure 3:
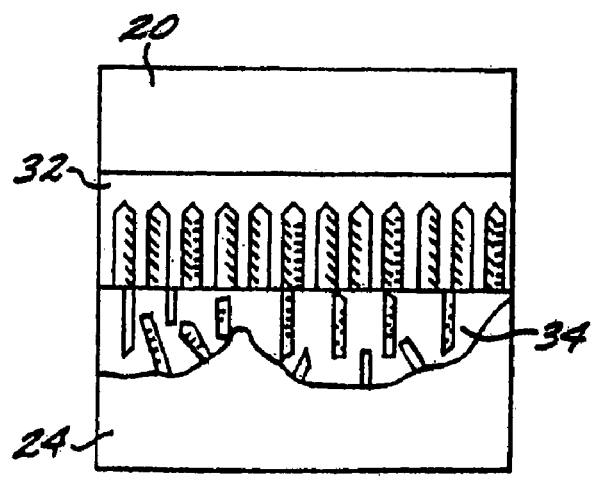
FIG. 3 is an enlarged, diagrammatic sectional view of the microstructure near the surface in the region depicted in FIG. 2.

FIGS. 2 and 3 are sections through the blade 10 showing the result of a conventional aluminide treatment without the benefit of any carburizing treatment, such as the carburizing treatment of the present invention. An aluminum-containing layer 20 is formed on a surface 22 of the airfoil section 12, which acts as a substrate 24. Optionally, in some cases a thin layer 26 of nickel or a noble metal, such as a platinum-containing layer, may be deposited on the surface 22 prior to deposition of the aluminum-containing layer 20. After application of layer 20 over surface 22, the blade 10 is heated to elevated temperature so that there is interdiffusion between the layer 20 (and optional layer 26) and the substrate 24, indicated generally by the arrows 28. The type, amount, and extent of the interdiffusion depends upon a number of factors such as time, temperature, substrate alloy, and activity of the aluminum source. Either during or after this process, an upper surface 30 is allowed to oxidize, forming an aluminum oxide layer (not shown). An optional ceramic topcoat may be applied over this outer layer.

The acicular TCP phases will vary from alloy to alloy, as the content and specific refractory elements will vary from alloy to alloy. The composition of the TCP phases in Alloy Rene '162 are discussed in U.S. Pat. No. 5,334,263. The actual chemical composition is not important, as the phases typically include refractory elements, depleting the surrounding matrix of these elements and forming the brittle acicular structure, thereby weakening the material matrix in secondary reaction zone 34 of FIG. 3. FIG. 3 depicts the resulting metallurgical microstructure in a typical refractory element-containing nickel-based superalloy turbine blade that has been aluminized. Two types of diffusion zones are produced. A primary diffusion zone 32 containing TCP phases, such as a sigma ($\Sigma$) phase, a mu ($\eta$) phase or a $\rho$-phase, either alone or in combination, in a beta or gamma prime matrix form just below the layer 20. The secondary reaction zone (SRZ) 34 forms between the primary diffusion zone 32 and the substrate 24. The SRZ 34 has been determined to result in reduced mechanical properties of the blade 10, particularly when it occupies a substantial fraction of the material below the surface 22. This situation is exacerbated when there is also a subsurface cooling passage 16 (FIG. 2), which almost invariably is present.

The present approach reduces the amount of available refractory element reactants available to form TCP phases in the near-surface, aluminum-rich regions by utilizing a carburizing process to form stable refractory carbide compounds in near surface regions 32 and 34 of the article within a preselected distance from the surface, while not reducing the refractory element concentration in other regions remote from the surface.

Figure 4:
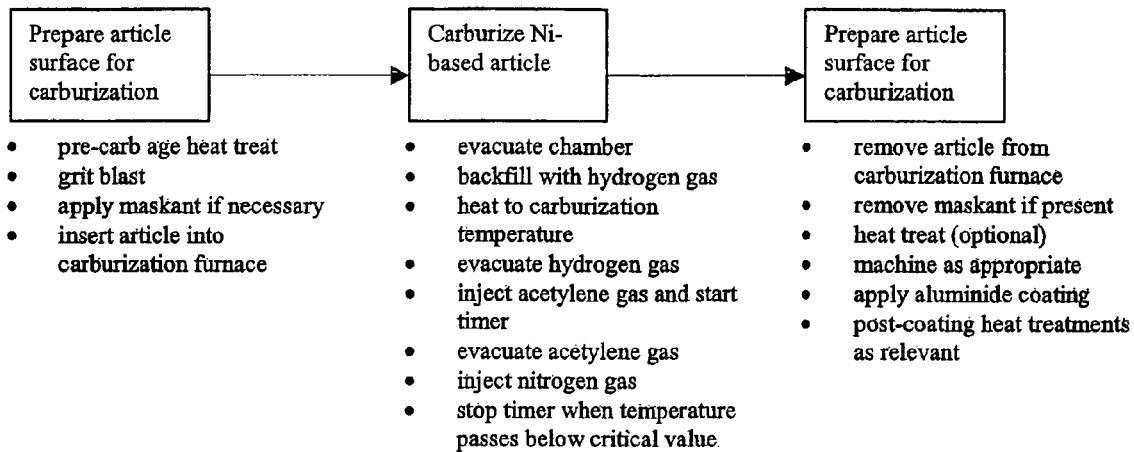
FIG. 4 is a process flow chart for the treatment of the invention.
Figure 4:
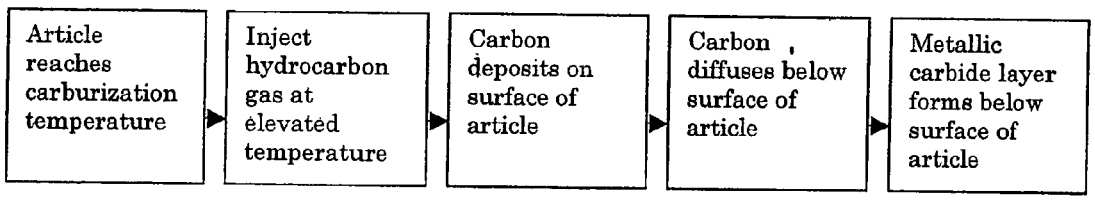

A preferred process for reducing the amount of available refractory element reactants that would otherwise be available to form the TCP phase is depicted in FIG. 4. A refractory containing nickel-based superalloy article, such as Rene 162, containing at least one element from the group consisting of rhenium, chromium, tantalum, molybdenum, tungsten ruthenium, iridium, osmium, and in certain alloys, platinum, palladium and rhodium, is provided. This alloy would form TCP phases following the aluminide process, unless processed to avoid such TCP phase formation.

According to the present invention, the article surface is cleaned to remove oxides. This can be achieved by mechanical or chemical means. However, it is preferred that the surface be cleaned using grit blasting techniques having adequate pressure and grit size remove the surface oxides. Acceptable grit size which do not otherwise alter the surface include 80-600 mesh grit, and preferably 80-220 mesh grit, at a pressure of 20-90 psi, preferably 40 psi, have been found to be acceptable. Alternatively, vapor honing may be used. Chemical etching is an alternate method that is acceptable to remove oxides.

After the surface has been cleaned to remove the oxides, the article surface must be carefully protected to prevent the reformation of oxides. This is probably best accomplished by quickly placing the workpiece into the working zone of the carburizing unit.

However, if there are portions of the article which are not to be carburized, an optional step of masking should be performed. While any suitable maskant may be utilized, certain maskants pose particular problems as they can be difficult to remove after carburizing. For example, nickel plating or copper plating, each excellent as a maskant, may be difficult or impossible to remove from an article surface having precise shapes or intricate details such as a turbine blade. However, a compound of boron glass containing magnesium-silicon, such as described in U.S. Patent Application Publication No. 20020020471, published Feb. 21, 2002, incorporated herein by reference, exhibits exceptional capabilities as a suitable maskant. This maskant is particularly preferred for use in vacuum carburization processes in which processing is performed at high temperatures. This maskant exhibits the two principal properties of a maskant: it is stable at the elevated temperatures of carburizing, and it is water soluble, making it easy to remove, even from the most complex surfaces.

After any optional maskants are applied and while maintaining the cleanliness of the article surface, the article is placed in a working zone of a suitable furnace. The furnace must be capable of preventing oxidation of the article surface as the article is heated to the carburization temperature. Thus vacuum furnaces or a furnace that can maintain a protective atmosphere are preferred. The atmosphere may be an inert atmosphere or a reducing atmosphere, maintained by the introduction of an inert gas or hydrogen into the furnace or by achieving a vacuum preferably with a pressure of less than 1 Torr. However, a reducing atmosphere, obtained by introducing at least a partial pressure of hydrogen into the furnace is most preferred. A partial pressure of hydrogen maintained at about 0.0005-10 Torr is preferred during this stage, but a partial pressure of 0.05-1.0 Torr is more preferred. As an option, even when the carburizing is to be performed in a vacuum furnace, a low partial pressure of hydrogen can be introduced into the vacuum furnace. Even though the hydrogen is ultimately removed as the vacuum is pulled by the vacuum pump, the reducing atmosphere assists in preventing the oxidation of the surface. For example, the vacuum is pulled as low as possible, less than about 1 Torr and preferably to 1 milli-Torr or lower. Then hydrogen gas is introduced at a partial pressure of 0.0005-10 Torr and most preferably at a partial pressure of 0.05-1.0 Torr.

After the preselected carburizing temperature is reached, the protective atmosphere is removed by stopping the flow of the protective gases. Optionally, as previously noted, the carburizing gas can be introduced at lower temperatures in conjunction with hydrogen or as a replacement for hydrogen as its partial pressure is reduced, provided that it is added at a temperature and in a volume so as not to form soot on the article surface. The carburizing temperature is in the range of 1800°-2250° F., preferably 1800°-2100° F., more preferably 1900°-2050° F., and most preferably in the range of 1925°-2000° F. Carburizing gas is then introduced into the working zone of the furnace. Hydrocarbons having triple bonded carbon atoms, generally known as alkynes, the simplest being acetylene (also known as ethyne) and represented by the chemical formula $C_2H_2$, H—C≡C—H, ethylene ($C_2H_4$) and propane are preferred and are believed to be the most effective carburizing agent for carburizing nickel-based superalloys that include refractory elements in order to prevent the formation of TCP phases near the surface of the substrate after aluminizing the article substrate, when the carburizing is performed under carefully controlled conditions of the present invention. These gases may be mixed in combination, or non-reactive gases such as argon, helium, or hydrogen may be added in order to control the chemical reactivity of the carburizing gases. Prior art methods that utilize chemical vapor deposition (CVD) techniques are time consuming and very limited by the size of the chambers used for the CVD process. While larger CVD chambers can be developed, this equipment is very expensive. The alkynes and ethylene are more reactive and chemically unstable at the temperatures of carburization of nickel-based superalloys than other carbon gases, such as saturated hydrocarbons including such widely used gases as methane ($CH_4$) and propane ($C_2H_6$). Thus the alkynes, in particular acetylene, and ethylene, decompose into their constituent elements more readily than the saturated hydrocarbons, thereby making free carbon readily available at the substrate surface in the working zone of the furnace. Because of their reactivity, care must be taken in the carburizing process to prevent the introduction of oxidizing agents, such as oxygen, as an explosive mixture can result. As noted above, these gases can be diluted with hydrogen or inert gases such as argon and helium, or even propane to control their chemical activity or as a safety measure.

The carburizing gases may be introduced into the carburizing device by any method that prevents the introduction of oxygen. The preferred methods are continuously flowing methods and pulse methods.

In the continuously flowing method, carburizing gas was introduced into the working zone of the furnace at the preselected elevated carburizing temperature. In this method, the carburizing gas was introduced at a partial pressure of about 2-3 Torr and this partial pressure was maintained for the duration of the carburizing operation, which was in the range of about 1 to about 240 minutes, but preferably is about 10 minutes. The preferred carburizing gas was acetylene with a carburizing time in the range of 1-20 minutes. The carburizing time will vary depending upon the reactivity of the carburizing gas mixture.

In the pulse method, which is most effective in a vacuum furnace, as will become obvious, a pulse of carburizing gas is introduced into the furnace at a preselected flow rate or to achieve a preselected partial pressure, for example, in the range of 0.1-10 Torr. The gas supply is then closed to prevent any additional flow of carburizing gas. After a period of time, which will vary depending upon a number of factors including but not limited to size of the working zone, size of the work load, temperature, vacuum pressure, etc. the working zone will be depleted of carburizing gas and hence of carbon. At this point, additional carburizing gas is introduced into the furnace and the process is repeated. The period of time required will vary as previously noted, but a typical period is about 5 minutes. The process is repeated until carburization is completed. Thus, if it takes 10 minutes of carburization to achieve the desired depth, it is expected that two pulse cycles will be required.

Carburization is continued until the desired carburization depth is reached at which time the operation is stopped by introducing an inert gas at about 1800° F. to cool the article rapidly. Carburization ceases when the article passes a critical temperature of less than 1800° F. The desired or target carburization depth is approximately equal to the depth that aluminum penetrates below the substrate during the aluminizing process. Small deviations (a few microns), either slightly greater than or slightly less than the target depth will not seriously impact the properties of the article Because the carburizing process is performed before the aluminizing process, it is necessary to estimate the depth of penetration of the aluminum. Of course, the depth of penetration of aluminum also will vary depending on a number of factors such as activity of aluminum, whether the process is thermally grown into the surface or an additive layer, processing temperature, the aluminizing process itself. However, experience indicates that the required carburizing depth is between about 10 microns to about 100 microns.

As will be recognized by those skilled in the art, several operating parameters can be varied, therefore these parameters must be controlled to control the desired carbide layer thickness. These parameters include, but are not limited to gas flow rate, which determines partial gas pressure, temperature, type of furnace, working zone size, work load and time. Gas flow rates of acetylene of about 100 liters/per hour for the current furnace have been found to be acceptable, with flow rates from as low as 50 liters/per hour to 100 liters per hour also likely to be acceptable. Of course, flow rates will vary with furnace type, furnace size and work load.

After processing and cooling, the work load, which typically will comprise a plurality of articles, can be removed from the work zone. Any optional masking may be removed before or after the aluminide treatment, depending upon whether or not the masked areas require aluminizing. Masking may be removed by any suitable means that does not adversely affect the substrate surface, such as chemical stripping, mechanical means such as blasting, or other known methods consistent with the masking material. The articles may also be heat treated as required, either before or after aluminizing, to age or otherwise develop the final desired microstructure. These aging treatments are related to precipitation hardening mechanisms of nickel-based superalloys, and have little or no effect on the stable carbide particles.

FIG. 5 illustrates the microstructure of the near-surface region of the blade 10 when the approach of the invention, just described in relation to FIG. 4, is followed. The structure is similar to that of FIG. 3, but no TCP phase is present and therefore no secondary reaction zone is present. Instead, an array of fine carbon-rich precipitates (carbides) 36 are present in the region to which the deposited carbon atoms have diffused in sufficient quantity to form carbides. These carbides typically contain refractory elements, such as rhenium, chromium, tantalum, tungsten, molybdenum, ruthenium, iridium, osmium and in certain alloys, palladium, rhodium and platinum, reducing the amount of these elements available to react to form the TCP phase in a depleted region 38, which may equivalently be described as a carbide-precipitate region. The carbides typically form within the gamma phase channels and are typically equal to or less than the size of the gamma prime precipitates, less than 1 micron diameter. The term "depleted region" means that the concentration of TCP phase-forming elements in a form suitable for reacting to form the TCP phase is reduced. The term should not be taken to mean that those elements have been completely removed from the depleted region 38. Instead, the TCP phase forming refractory elements are present, but in a substantially reacted form such that they cannot form the TCP phase.

As the article is aluminided, aluminum diffuses from the layer 20 into the substrate to an extent indicated by an aluminide depth 40. This diffusion, like the diffusion of carbon during carburization, is governed by the well known Fick's Second Law of Diffusion, being dependent on time and temperature. The depleted region 38 extends to a depth which is preferably approximately equal to the aluminide depth 40, but may be slightly greater than or less than the aluminide depth 40. The depleted region 38 extends to a depth of from about 10 to about 100 microns, preferably 25-100 microns below the surface of the substrate, and the aluminide layer 40 extends to a depth of from about 25 to about 50 micrometers below the surface of the substrate. If the depleted region 38 is substantially greater than the aluminide depth 40, the excess volume of material is unnecessarily depleted of the solid-solution strengthening refractory elements and includes unnecessary carbide precipitates. The carbide precipitates may cause premature failure of the superalloy if the depth of the region 38 is too great. If the depleted region 38 is substantially less than the aluminide depth 40, there will be a small region where the TCP phase may form. The result is a secondary reaction zone that is smaller than would otherwise be present, but its presence is still detrimental.

Even though the near surface portion of the article include carbides, typically tantalum carbides, that increase the hardness from about 40-45 Rc to 55-60Rc, these nickel-based superalloy articles can still be subject to traditional manufacturing processes such as drilling, coating, shot peening etc. Carburization does not inhibit such traditional manufacturing processes.

EXAMPLE 1

Articles were carburized in a Turbotreater® horizontal vacuum carbuizing furnace, Model H3636 AvaC™ Ipsen International Furnace having multiple nozzles for introducing gases. Such a furnace is available from Ipsen International of Rockford, Ill. The furnace has a working zone of 3'×2'×2' (l×w×h). The furnace utilizes carbon heating elements that do not react with the gases introduced. The working zone was loaded with a plurality of turbine blades, after cleaning, about 10-50. These turbine blades are small commercial engine blades made of refractory-containing superalloy and having a size (overall blade length) of about 1.5". The blades were maintained under a reducing atmosphere, as hydrogen was introduced into the furnace to a pressure of about 0.150 Torr until the carburizing temperature of 1975° F. was reached. Once at 1975° F., the hydrogen was evacuated from the furnace work zone and acetylene gas was then introduced into the furnace at a flow rate of approximately 100 liters per hour to maintain a pressure of about 2 Torr for a time of about 10 minutes. After the 10 minutes of carburization, the acetylene was evacuated from the furnace work zone and nitrogen gas was introduced to allow for rapid cooling of the load below about 1800° F. A zone of submicron carbide particles was formed in the near surface region of the blades, the depth of which was about 66 microns for the blades observed. A carburized blade was coated with platinum modified beta nickel-aluminide coating and then exposed to 2000° F. for about 400 hours. The aluminide coated blade after thermal exposure showed no formation of SRZ where an aluminide coated non-carburized control sample produced about 0.004" depth of SRZ that covered greater than 50% of the surface area.

EXAMPLE 2

A Turbotreater® horizontal vacuum carburizing furnace Model H3636 AvaC™ Ipsen International Furnace was used, as described in Example 1. 1" diameter by 0.125" thick specimen were maintained under a vacuum atmosphere of less than 0.001 Torr until the carburizing temperature of 1975° F. was reached. Once the temperature was stabilized at 1975° F., acetylene gas was introduced into the furnace at a flow rate of about 100 liters per hour to maintain a pressure of about 2 Torr for a time of about 10 minutes. After about 10 minutes of carburization, the acetylene was evacuated from the furnace work zone and argon gas was introduced to allow for rapid cooling of the furnace load below about 1800° F. A zone of submicron carbide particles was formed in the near surface region of the blades, the depth of which was about 74 microns for the samples. A sample was coated with a platinum modified beta nickel-aluminide coating ant then exposed to 2000° F. for about 400 hours. The aluminide coated blade after thermal exposure showed no formation of SRZ.

The present invention provides an improved structure to nickel-base superalloys that would otherwise be susceptible to formation of a secondary reaction zone. Such superalloys with aluminide, platinum aluminide (or other noble metal aluminide), and overlay coatings, including MCrAlY overlay coatings or beta nickel aluminide overlay coatings such as disclosed in U.S. Pat. No. 6,261,084, incorporated herein by reference, benefit from the approach of the invention. The process used to form the stable carbides can be performed using the preferred temperatures and carburization gases more quickly than other known methods. Despite the shorter times required, the precise depths of carbide formation can still be carefully controlled.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments.

What is claimed is:

1. A method for preparing a coated article, comprising the steps of:
providing a nickel-based superalloy substrate, the nickel-based superalloy substrate including at least one refractory element;
cleaning a surface of the nickel-based superalloy substrate by removing surface oxides;
placing the substrate article in a working zone of a furnace;
heating the substrate article to a carburizing temperature while maintaining a non-oxidizing atmosphere in the working zone of the furnace;
upon reaching the carburizing temperature, introducing into the working zone of the furnace a carburizing gas selected from the group consisting of alkynes, ethylene, propane and combinations thereof;
maintaining sufficient carburizing gas in the working zone of the furnace for a time and at a temperature to carburize a near surface region of the superalloy substrate to a maximum depth of about 100 microns;
then, stopping the flow of carburizing gas into the working zone of the furnace and substantially simultaneously introducing a non-reactive gas into the working zone of the furnace to cool the article to a preselected carburizing temperature; and thereafter
applying an aluminide coating to at least a portion of the surface cleaned by removing surface oxides.

2. The method of claim 1 wherein the step of providing a nickel-based superalloy article includes providing a turbine airfoil.

3. The method of claim 2 wherein the step of providing a turbine airfoil further includes providing an airfoil selected from the group consisting of a blade and a vane.

4. The method of claim 1 further including an additional step of masking a preselected portion of the substrate surface, thereby leaving the remainder of the substrate surface exposed prior to placing the article in the furnace, and wherein the step of applying an aluminide coating includes applying a diffusion aluminide coating over the carburized portion of the substrate.

5. The method of claim 1 wherein the step of cleaning the surface of the substrate further includes grit blasting the substrate surface at a preselected pressure using grit of a preselected size to remove surface oxides.

6. The method of claim 5 wherein the preselected pressure is about 20-90 psi and the preselected grit size is 80-600 mesh grit.

7. The method of claim 1 wherein the step of heating the substrate article while maintaining a non-oxidizing atmosphere in the working zone of the furnace includes maintaining a reducing atmosphere and wherein a reducing gas that provides the reducing atmosphere is hydrogen.

8. The method of claim 1 wherein the step of heating the substrate article while maintaining a non-oxidizing atmosphere in the working zone of the furnace includes maintaining an inert atmosphere and wherein an inert gas that provides the inert atmosphere is selected from the group consisting of argon, helium and combinations thereof.

9. The method of claim 1 wherein the step of heating the substrate article while maintaining the non-oxidizing atmosphere in the working zone of the furnace includes maintaining the non-oxidizing atmosphere at a partial pressure of about 0.0005-10 Torr.

10. The method of claim 9 wherein the step of heating the substrate article while maintaining the non-oxidizing atmosphere in the working zone of the furnace includes maintaining the non-oxidizing atmosphere at a partial pressure of about 0.05-1.0 Torr.

11. The method of claim 1 wherein the step of heating the substrate article to the carburizing temperature includes heating the article to a temperature in the range of about 1800°-2250° F.

12. The method of claim 11 wherein the step of heating the substrate article to the carburizing temperature includes heating the article to a temperature in the range of 1900°-2050° F.

13. The method of claim 1 wherein the step of maintaining sufficient carburizing gas in the working zone of the furnace is accomplished by a method selected from the group consisting of the pulse method and the continuous method.

14. The method of claim 1 wherein the step of introducing into a carburizing gas includes introducing acetylene.

15. The method of claim 13 wherein the step of maintaining sufficient carburizing gas in the working zone of the furnace is accomplished while avoiding the formation of soot on the substrate surface.

* * * * *